United States Patent
Inagaki et al.

(10) Patent No.: US 11,972,915 B2
(45) Date of Patent: Apr. 30, 2024

(54) BREAKING DEVICE (71) Applicant: Mitsubishi Electric Corporation, Tokyo (JP)

(72) Inventors: Takashi Inagaki, Tokyo (JP); Sho Tokoyoda, Tokyo (JP); Hiroki Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 276 days.

(21) Appl. No.: 17/606,771

(22) PCT Filed: May 28, 2019

(86) PCT No.: PCT/JP2019/021117
§ 371 (c)(1),
(2) Date: Oct. 27, 2021

(87) PCT Pub. No.: WO2020/240702
PCT Pub. Date: Dec. 3, 2020

(65) Prior Publication Data
US 2022/0208490 A1 Jun. 30, 2022

(51) Int. Cl.
*H02H 3/00* (2006.01)
*H01H 33/16* (2006.01)
(Continued)

(52) U.S. Cl.
CPC .......... *H01H 33/596* (2013.01); *H01H 33/16* (2013.01); *H02H 3/087* (2013.01)

(58) Field of Classification Search
None
See application file for complete search history.

(56) References Cited

U.S. PATENT DOCUMENTS 4,434,332 A 2/1984 Yanabu et al.
5,737,162 A * 4/1998 Ito .................. H01H 33/596
361/13
(Continued)

FOREIGN PATENT DOCUMENTS

JP S5632631 A 4/1981
JP S5736733 A 2/1982
(Continued)

OTHER PUBLICATIONS

International Search Report (PCT/ISA/210) with translation and Written Opinion (PCT/ISA/237) dated Sep. 3, 2019, by the Japan Patent Office as the International Searching Authority for International Application No. PCT/JP2019/021117. (8 pages).
(Continued)

*Primary Examiner* — Stephen W Jackson
(74) *Attorney, Agent, or Firm* — BUCHANAN INGERSOLL & ROONEY PC (57) ABSTRACT

A breaking device includes an interrupting section including interrupting units in which main interrupters, impedance circuits, and unit arresters are connected in parallel to each other, the main interrupters being connected in series, a resonant circuit section including a reactor, a capacitor, and a closing switch and connected in parallel to the interrupting section, and an all-point arrester connected in parallel to the interrupting section via the reactor. The clamping voltages of the unit arresters are equal among the interrupting units, and are in the range of 1.1 to 1.6 times the value obtained by dividing the clamping voltage of the all-point arrester by the number of the interrupting units connected in series in the interrupting section.

5 Claims, 11 Drawing Sheets (51) Int. Cl.
*H01H 33/59* (2006.01)
*H02H 3/087* (2006.01)

(56) References Cited

U.S. PATENT DOCUMENTS

| | | | | |
|---|---|---|---|---|
| 5,793,586 | A | * | 8/1998 | Rockot .................. H01H 9/541 361/8 |
| 5,837,953 | A | * | 11/1998 | Ito .......................... H01H 33/18 218/22 |
| 2013/0278078 | A1 | * | 10/2013 | Ohlsson ................. H02H 3/025 307/113 |
| 2016/0105014 | A1 | | 4/2016 | Lee et al. |
| 2017/0271100 | A1 | | 9/2017 | Ka et al. |
| 2021/0111556 | A1 | * | 4/2021 | Tokoyoda .............. H02H 3/087 |
| 2021/0358702 | A1 | * | 11/2021 | Tokoyoda .............. H02H 3/087 |

FOREIGN PATENT DOCUMENTS

| | | |
|---|---|---|
| JP | S59128714 A | 7/1984 |
| JP | S62113326 A | 5/1987 |
| JP | 2016081923 A | 5/2016 |
| WO | 2016056098 A1 | 4/2016 |

OTHER PUBLICATIONS

Notice of Reasons for Refusal with translation issued in corresponding Japanese Patent Application No. 2019-559120 dated Nov. 26, 2019. (6 pages).

* cited by examiner

BREAKING DEVICE

FIELD

The present invention relates to a breaking device that interrupts high-voltage current using forced-arc-extinguishing mechanical switches as main interrupters of an interrupting section.

BACKGROUND

Some breaking devices for interrupting high-voltage current adopt a so-called multi-break configuration in which an interrupting section includes a plurality of main interrupters connected in series.

It is important for a multi-break breaking device to equally divide, among main interrupters, transient recovery voltages (TRVs) generated between the poles of the main interrupters immediately after interruption, and a system voltage applied between the poles of the main interrupters when the main interrupters are opened, that is, to equalize voltage sharing. In a case where voltage sharing is not equalized, it is necessary to provide a margin of withstand voltage performance to each main interrupter with the imbalance in voltage sharing taken into account. This causes the problem in that the equipment is increased in size, and the specifications of the main interrupters become excessive.

To address the above-described problem, Patent Literature 1 below discloses a technique for equalizing voltage sharing by connecting capacitors for equal voltage dividing (hereinafter, abbreviated as "voltage equalization") and resistors for voltage equalization in parallel between the poles of main interrupters.

CITATION LIST

Patent Literature

Patent Literature 1: Japanese Patent Application Laid-open No. S56-32631

SUMMARY

Technical Problem

In a case where main interrupters are forced-arc-extinguishing mechanical switches, it is difficult to avoid variations in interrupting timing even by reducing variations in the mechanical operation of the main interrupters, due to the interruption characteristics of arcs generated between the poles at the time of interruption, minute differences in interrupting duty among the main interrupters connected in series, etc.

When interrupting timing varies at the main interrupters, the TRV of all the main interrupters is applied between the poles of a main interrupter that interrupts first until the remaining main interrupters interrupt later.

In the configuration of Patent Literature 1 above, the capacitors for voltage equalization connected in parallel to the corresponding main interrupters attempt to contribute to the equalization of voltage sharing immediately after main interrupters that interrupt late interrupt. However, their time constants cannot follow an abrupt voltage change, resulting in the completion of the interruption with the voltage sharing of the main interrupters left unequal.

Therefore, in a case where the technique of Patent Literature 1 is used, it is necessary to take measures such as providing an extra margin to the withstand voltage performance of the main interrupters of the interrupting section or providing an extra number of main interrupters connected in series, which is a factor in hindering reductions in the size and cost of the interrupting section including the main interrupters.

The present invention has been made in view of the above, and an object thereof is to provide a breaking device that prevents the withstand voltage performance of the interrupting section from becoming excessive, allowing reductions in the size and cost of an interrupting section.

Solution to Problem

In order to solve the above-described problems and achieve the object, a breaking device according to the present invention includes an interrupting section including a plurality of interrupting units, in each of which a main interrupter, a voltage divider circuit, and a first arrester are connected in parallel to each other, a plurality of the main interrupters being connected in series. Further, the breaking device includes a resonant circuit section including a reactor, a capacitor, and a closing switch, the resonant circuit section being connected in parallel to the interrupting section. Furthermore, the breaking device includes a second arrester connected in parallel to the interrupting section via the reactor. The clamping voltages of the first arresters are equal between the plurality of interrupting units, and are in the range of 1.1 to 1.6 times the value obtained by dividing the clamping voltage of the second arrester by the number of the interrupting units connected in series in the interrupting section.

Advantageous Effects of Invention

The breaking device according to the present invention has the effects of being able to prevent the withstand voltage performance of the interrupting section from becoming excessive, allowing reductions in the size and cost of the interrupting section.

DESCRIPTION OF EMBODIMENTS

Hereinafter, a breaking device according to embodiments of the present invention will be described in detail with reference to the accompanying drawings. Note that the following embodiments are not intended to limit the present invention. In the following description, an electrical connection will be simply referred to as a "connection".

First Embodiment

Figure 1:
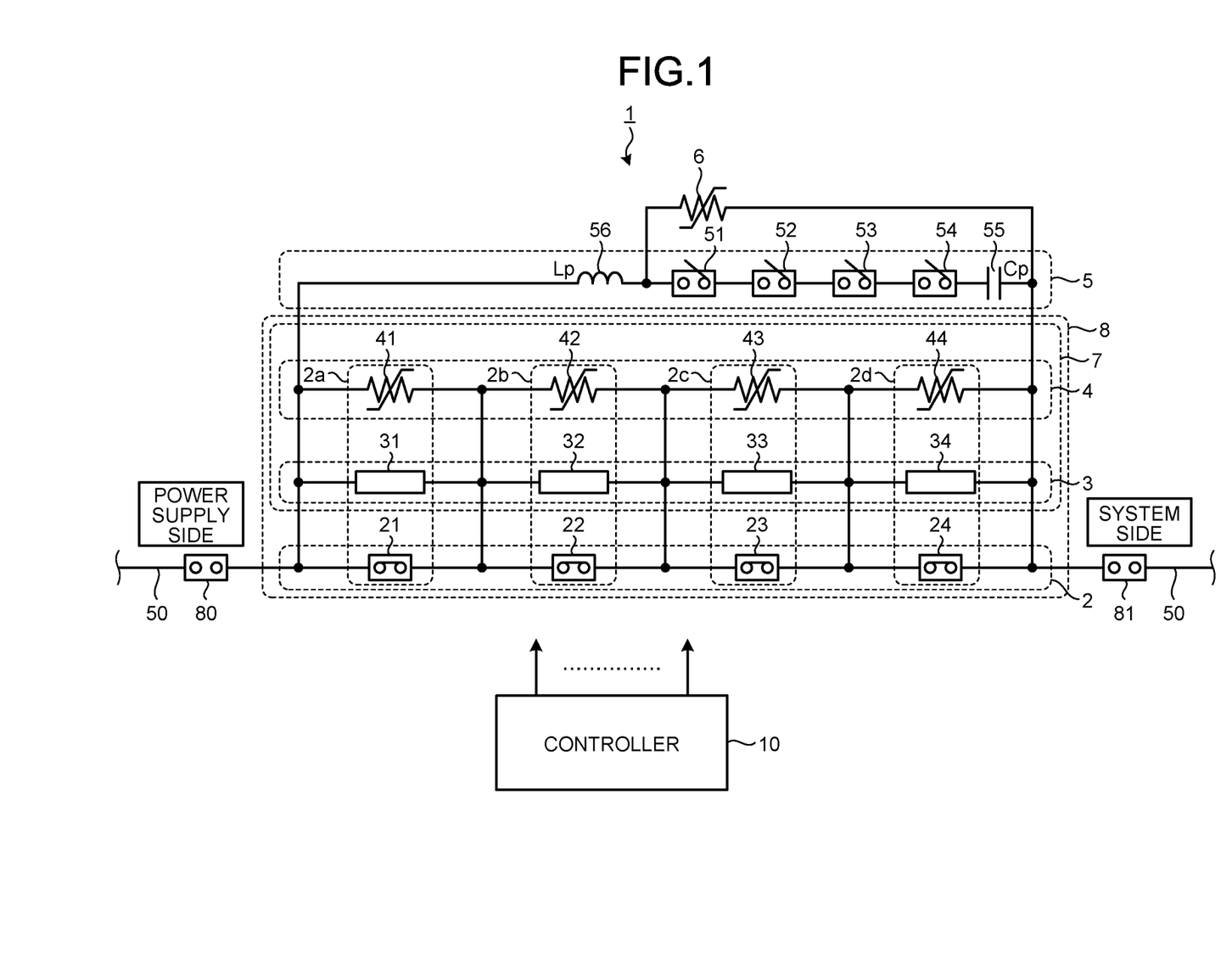
FIG. 1 is a diagram illustrating an example of a circuit configuration of a breaking device according to a first embodiment.
Figure 2:
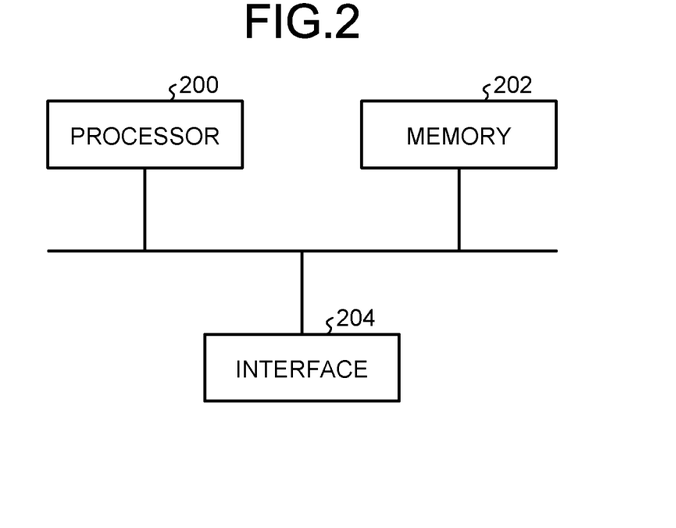
FIG. 2 is a diagram illustrating an example of a hardware configuration that implements functions of a controller in the first embodiment.

FIG. 1 is a diagram illustrating an example of a circuit configuration of a breaking device according to a first embodiment. FIG. 2 is a diagram illustrating an example of a hardware configuration that implements functions of a controller in the first embodiment.

A breaking device 1 according to the first embodiment includes a main interrupter group 2, a voltage divider circuit group 3, a unit arrester group 4, a resonant circuit section 5, an all-point arrester 6, and a controller 10.

As illustrated in FIG. 1, the main interrupter group 2 includes a plurality of main interrupters 21, 22, 23, and 24 connected in series. That is, the breaking device 1 according to the first embodiment is a breaking device of a so-called multi-break configuration. The main interrupters 21, 22, 23, and 24 are DC interrupters disposed on a DC line 50 that is a main line. An example of the main interrupters 21, 22, 23, and 24 is a vacuum interrupter having a high current interruption capability. Alternatively, a switch other than a vacuum interrupter may be used as a main interrupter.

In FIG. 1, the side on which the main interrupter 21 is disposed is the power supply side, and the side on which the main interrupter 24 is disposed is the system side. Disconnectors 80 and 81 are disposed on the DC line 50 on the power supply side and the system side, respectively. The disconnector 80 is a switch for disconnecting the breaking device 1 from the power supply. The disconnector 81 is a switch for disconnecting the breaking device 1 from the system.

The voltage divider circuit group 3 includes a plurality of impedance circuits 31, 32, 33, and 34 for voltage equalization connected in series. Components of each impedance circuit are a capacitor element and a resistor. The impedance circuit 31, which is a first voltage divider circuit, is connected in parallel to the main interrupter 21, which is a first main interrupter. The impedance circuit 32, which is a second voltage divider circuit, is connected in parallel to the main interrupter 22, which is a second main interrupter. The impedance circuit 33, which is a third voltage divider circuit, is connected in parallel to the main interrupter 23, which is a third main interrupter. The impedance circuit 34, which is a fourth voltage divider circuit, is connected in parallel to the main interrupter 24, which is a fourth main interrupter. The impedance circuits 31, 32, 33, and 34 operate to equally divide inter-pole voltage generated between the poles of the corresponding main interrupters connected in parallel thereto.

The unit arrester group 4 includes a plurality of unit arresters 41, 42, 43, and 44 connected in series. The unit arresters 41, 42, 43, and 44 exemplify energy-absorbing devices. The unit arresters 41, 42, 43, and 44 reduce inter-pole voltage generated between the poles of the corresponding main interrupters connected in parallel thereto to a clamping voltage or less. Each of the unit arresters 41, 42, 43, and 44 may be referred to as a "first arrester", and the all-point arrester 6 may be referred to as a "second arrester".

The main interrupter 21, the impedance circuit 31, and the unit arrester 41 connected in parallel to each other constitute an interrupting unit 2a. The main interrupter 22, the impedance circuit 32, and the unit arrester 42 connected in parallel to each other constitute an interrupting unit 2b. The main interrupter 23, the impedance circuit 33, and the unit arrester 43 connected in parallel to each other constitute an interrupting unit 2c. The main interrupter 24, the impedance circuit 34, and the unit arrester 44 connected in parallel to each other constitute an interrupting unit 2d.

The voltage divider circuit group 3 and the unit arrester group 4 constitute a voltage sharing improvement section 7. The main interrupter group 2 and the voltage sharing improvement section 7 constitute an interrupting section 8.

The resonant circuit section 5 is connected in parallel to both ends of the main interrupter group 2 together with the voltage divider circuit group 3 and the unit arrester group 4. The resonant circuit section 5 is a circuit that generates a resonant current to be superimposed on a fault current when the fault current flows through the DC line 50. The resonant circuit section 5 includes closing switches 51, 52, 53, and 54, a capacitor 55, and a reactor 56 connected in series. The capacitor 55 is charged to a predetermined voltage in advance by an external charging device (not illustrated) or a system voltage. An example of the closing switches 51, 52, 53, and 54 is a discharge gap device. The frequency of the resonant current is determined by the capacitance Cp of the capacitor 55 and the inductance Lp of the reactor 56.

The all-point arrester 6, which is the second arrester, is connected in parallel to both ends of a series circuit including the closing switches 51, 52, 53, and 54 and the capacitor 55. With this connection, in terms of circuitry, a series circuit including the all-point arrester 6 and the reactor 56 is connected in parallel to both ends of the main interrupter group 2.

In FIG. 1, the number of the interrupting units, that is, the number of the interrupting units connected in series in the interrupting section 8 is four, but the present invention is not limited thereto. The number of interrupting units connected in series may be two or more, that is, more than one, with which the effects of the present embodiment described later can be obtained.

The controller 10 controls the opening and closing of the main interrupters 21, 22, 23, and 24 and the closing switches 51, 52, 53, and 54. Each of the main interrupters 21, 22, 23, and 24 and the closing switches 51, 52, 53, and 54 may be referred to as a "switch".

The functions of the controller 10 may be implemented by, as illustrated in FIG. 2, a configuration including a processor 200 that performs operations, a memory 202 that stores a program read by the processor 200, and an interface 204 that performs the input and output of signals. A program for controlling the opening and closing of each switch is held in the memory 202. The controller 10 sends and receives necessary information via the interface 204, and causes the processor 200 to execute the program stored in the memory 202, thereby performing control described later.

The processor 200 may be an arithmetic means such as an arithmetic unit, a microprocessor, a microcomputer, a central processing unit (CPU), or a digital signal processor (DSP). The memory 202 corresponds to a nonvolatile or volatile semiconductor memory such as a random-access memory (RAM), a read-only memory (ROM), a flash memory, an erasable programmable ROM (EPROM), or an electrically EPROM (EEPROM) (registered trademark).

Figure 3:
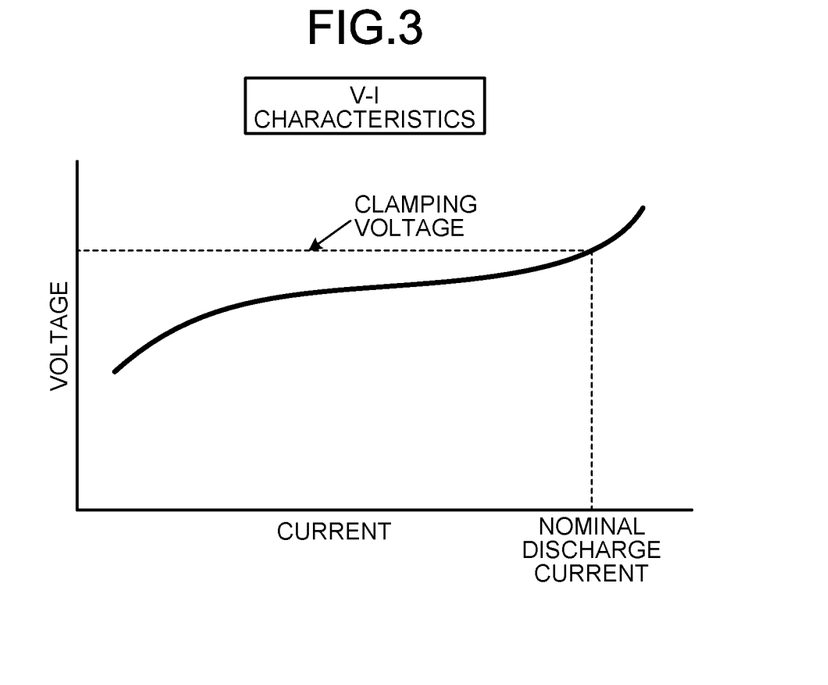
FIG. 3 is a diagram illustrating an example of the voltage-current characteristics of a typical arrester used in the first embodiment.

FIG. 3 is a diagram illustrating an example of the voltage-current characteristics of a typical arrester used in the first embodiment. In FIG. 3, the horizontal axis represents current and the vertical axis represents voltage. As illustrated in FIG. 3, the arrester has a nonlinear characteristic. When a certain voltage or more is applied, the resistance value rapidly decreases, forming a conductive band. During the discharge of the arrester, this characteristic limits overvoltage even when current increases. A limited voltage thus generated across the arrester during the discharge of the arrester is a "clamping voltage". In the technical field of the present invention, as illustrated in FIG. 3, a voltage when a current flowing through the arrester is a nominal discharge current is typically referred to as a "clamping voltage".

Next, the configuration and operation related to the principal part of the breaking device 1 according to the first embodiment will be described.

First, the characteristics of the configuration of the first embodiment are as follows.

(a) The clamping voltages of the unit arresters 41, 42, 43, and 44, which are the first arresters, are equal among the corresponding interrupting units.

(b) The clamping voltages of the unit arresters 41, 42, 43, and 44, which are the first arresters, are in the range of 1.1 to 1.6 times the value obtained by dividing the clamping voltage of the all-point arrester 6, which is the second arrester, by the number of the interrupting units connected in series in the interrupting section 8.

Here, the clamping voltage of the all-point arrester 6 is represented by "Vt", the clamping voltage of each interrupting unit by "Vu", and the number of the interrupting units connected in series by "n". A multiple by which the value resulting from the division by the number of series connections n is multiplied is represented by "K" and is referred to as a "multiple K". Then, the clamping voltage Vu of each interrupting unit can be expressed by equation (1) below, using the clamping voltage Vt of the all-point arrester 6, the number of series connections n, and the multiple K. The relationship in (b) above related to the multiple K can be expressed by equation (2) below.

$$Vu = Vt/n \times K \quad (1)$$

$$1.1 \leq K \leq 1.6 \quad (2)$$

The reason for the above setting will be described below with reference to FIGS. 4 to 9.

Figure 4:
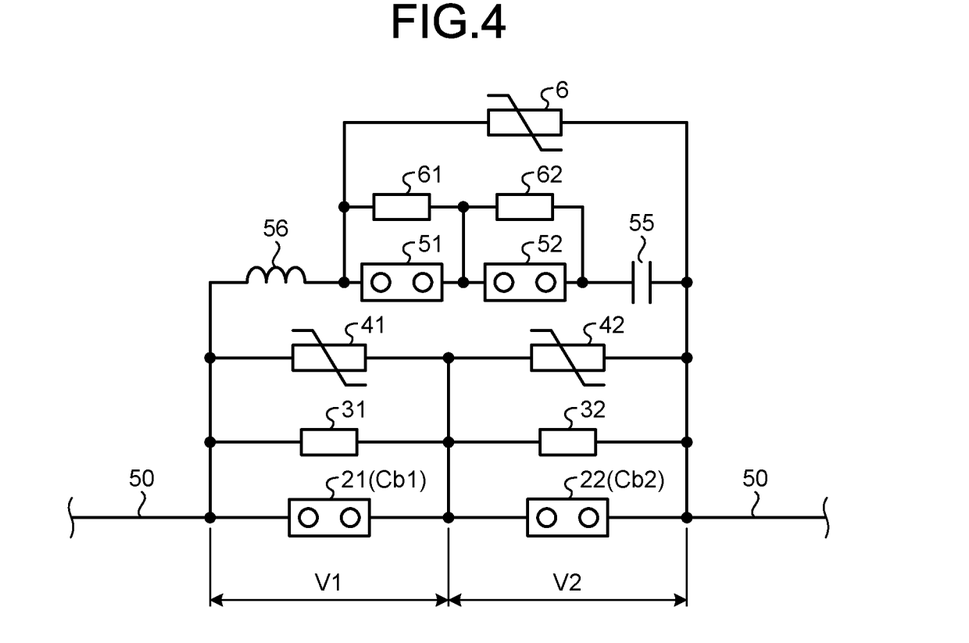
FIG. 4 is a basic circuit diagram for explaining operation in the first embodiment.

FIG. 4 is a basic circuit diagram for explaining operation in the first embodiment. In the basic circuit diagram illustrated in FIG. 4, the numbers of components of the main interrupter group 2, the voltage divider circuit group 3, the unit arrester group 4, and the resonant circuit section 5 are set to a minimum component number of "two". In the configuration of FIG. 4, impedance circuits 61 and 62 for voltage equalization are connected to both ends of the closing switches 51 and 52, respectively. In the following description, the main interrupter 21 may be denoted as "Cb1", and the main interrupter 22 may be denoted as "Cb2".

Figure 5:
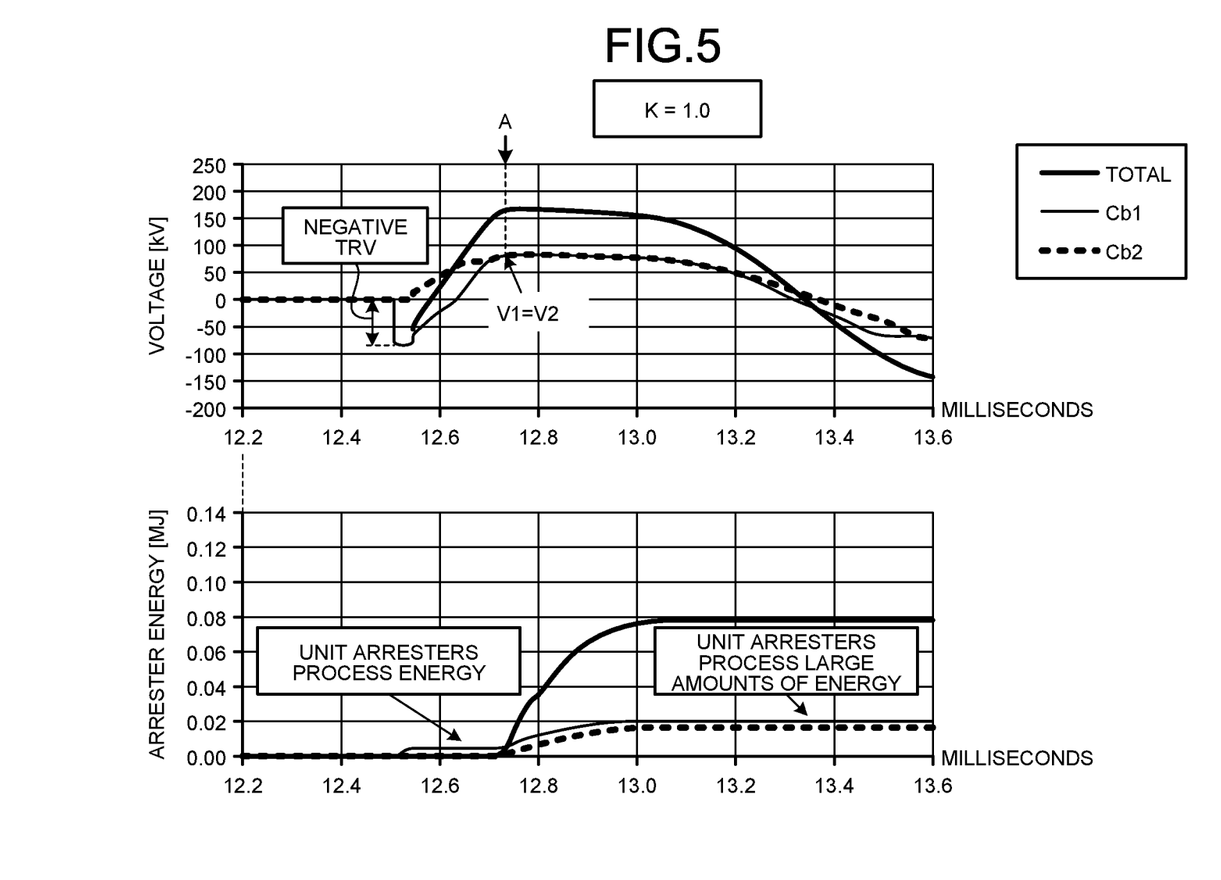
FIG. 5 is a diagram illustrating a first example waveform for explaining the principal part of the first embodiment.

FIG. 5 is a diagram illustrating a first example waveform for explaining the principal part of the first embodiment. The upper part of FIG. 5 illustrates voltage waveforms during interruption, that is, TRV changes over time. The example of FIG. 5 is waveforms based on simulation results when the main interrupter Cb1 interrupts first, and the main interrupter Cb2 interrupts later in the configuration of the basic circuit diagram illustrated in FIG. 4. A thin solid line indicates the TRV of the main interrupter Cb1, a thick broken line indicates the TRV of the main interrupter Cb2, and a thick solid line indicates the total TRV of the main interrupters Cb1 and Cb2 obtained by adding the TRV value of the main interrupter Cb1 and the TRV value of the main interrupter Cb2.

When a fault current flows in the DC line 50, a resonant current superimposed on the fault current forms a zero point. In the example of FIG. 5, the main interrupter Cb1 interrupts first. At this time, a reserve of energy remains in the capacitor 55, and thus the voltage of the capacitor 55 at that time appears with the opposite polarity across the main interrupter Cb1. This is a "negative TRV" illustrated in the upper part of FIG. 5. Consequently, the main interrupter Cb1 that has interrupted first has a waveform starting from the negative TRV, whereas the main interrupter Cb2 that interrupts later has a waveform starting from zero. Both of the main interrupters Cb1 and Cb2 are limited in voltage by the clamping voltage generated by the corresponding arresters connected in parallel thereto. In the example of FIG. 5, the above-described multiple K is set to K=1.0, and thus a case is assumed in which an overall interruption is completed after the TRV of the main interrupter Cb2 reaches the clamping voltage. Thus, the TRV of the main interrupter Cb1 starting from the negative TRV catches up with the clamping voltage of the main interrupter Cb2. Consequently, when the overall interruption is completed, V1=V2, and V1/V2=1.0.

In the lower part of FIG. 5, energy processed by the unit arrester 41 is indicated by a thin solid line, and energy processed by the unit arrester 42 is indicated by a thick broken line. In addition, total energy processed by the unit arresters 41 and 42 and the all-point arrester 6 is indicated by a thick solid line. As can be understood from these waveforms, in the example of FIG. 5, the amounts of energy processed by the unit arresters 41 and 42 are relatively large processing amounts compared to the total amount of energy processed by the unit arresters.

Figure 6:
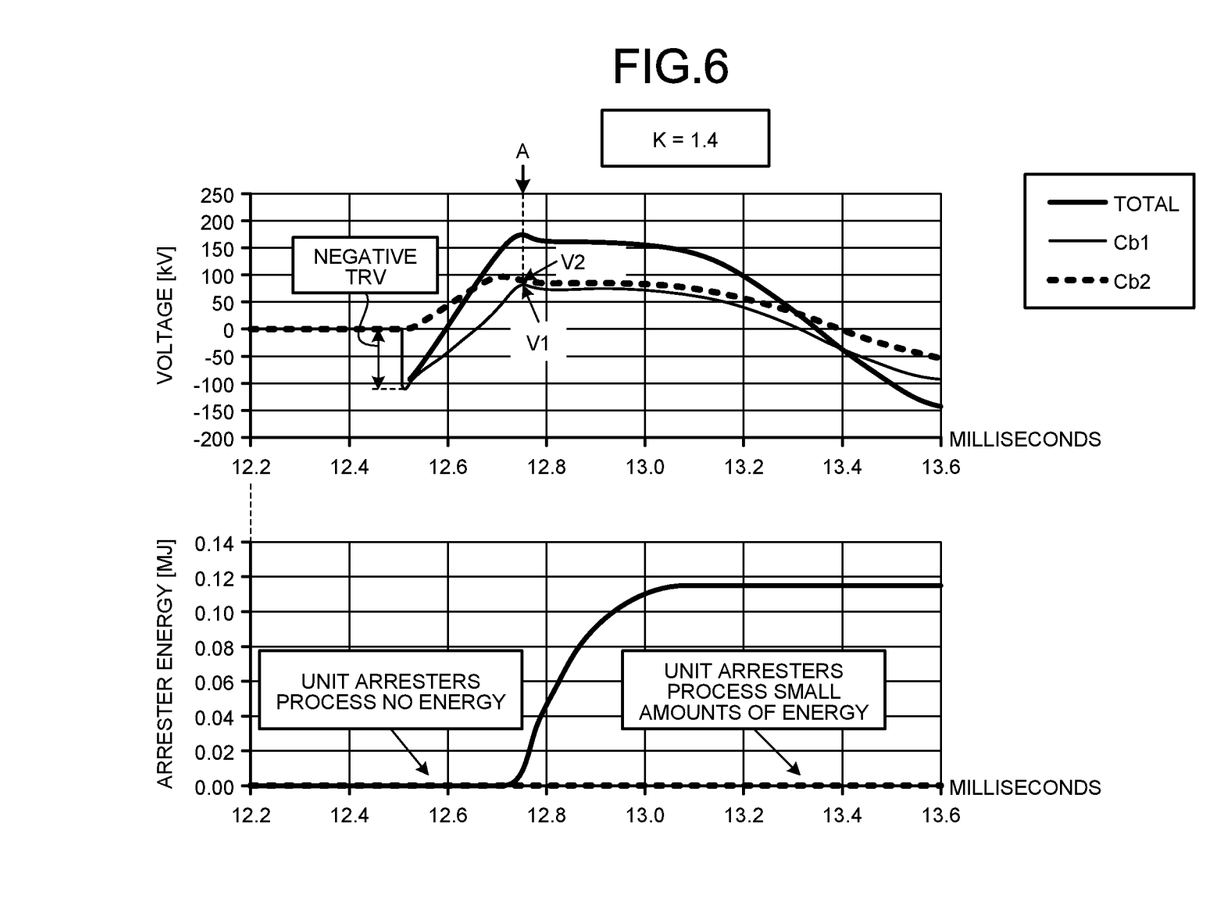
FIG. 6 is a diagram illustrating a second example waveform for explaining the principal part of the first embodiment.

FIG. 6 is a diagram illustrating a second example waveform for explaining the principal part of the first embodiment. The meanings of waveforms of the respective parts are the same as those in FIG. 5. Execution conditions are the same as those in FIG. 5 except for the value of the multiple K.

FIG. 6 illustrates simulation results when the above-described multiple K is set to K=1.4. In the example of FIG. 6, since the multiple K is set to K=1.4, a case is assumed in which an overall interruption is completed before the TRV of the main interrupter Cb2 reaches the clamping voltage. This results in a relationship of V1<V2 at the completion of the overall interruption. In the example of FIG. 6, the value of V1/V2 is about 0.88.

The TRVs of the main interrupters Cb1 and Cb2 have waveforms that change with time. The value of V1/V2 varies with time. Thus, the time at which the value of V1/V2 is determined is set to a point A at which the total TRV of the main interrupters Cb1 and Cb2 peaks.

The lower part of FIG. 6 illustrates waveforms of arrester energy. According to the waveforms in the lower part of FIG. 6, it can be seen that the amounts of energy processed by the unit arresters 41 and 42 are smaller than those in FIG. 5.

Figure 7:
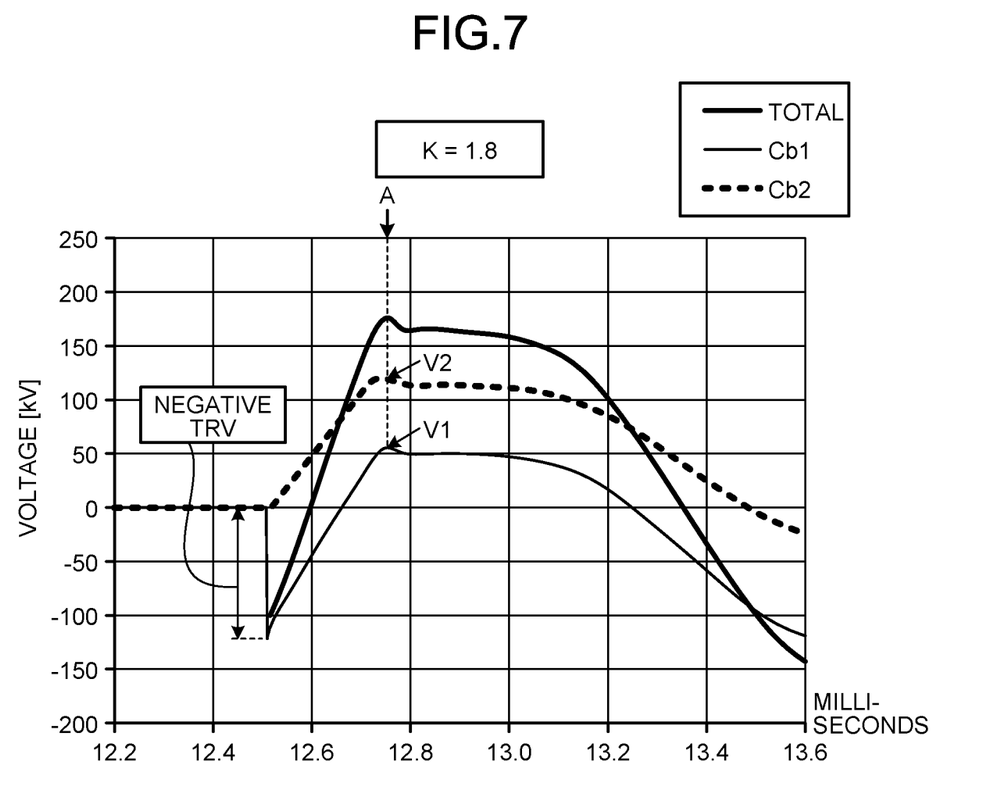
FIG. 7 is a diagram illustrating a third example waveform for explaining the principal part of the first embodiment.

FIG. 7 is a diagram illustrating a third example waveform for explaining the principal part of the first embodiment. The meanings of waveforms of the respective parts are the same as those in FIGS. 5 and 6. Execution conditions are the same as those in FIGS. 5 and 6 except for the value of the multiple K.

FIG. 7 illustrates simulation results when the above-described multiple K is set to K=1.8. In the example of FIG. 7, since the multiple K is set to K=1.8, a case as in FIG. 6 is assumed in which an overall interruption is completed before the TRV of the main interrupter Cb2 reaches the clamping voltage. Furthermore, since the value of the multiple K is larger than that in the example of FIG. 6, the value of V1/V2 is smaller than that in the example of FIG. 6. Specifically, the value of V1/V2 in the example of FIG. 7 is about 0.46.

It is known that increasing the value of the multiple K improves the amounts of energy processed by the unit arresters 41 and 42 relative to the total amount of energy processed by the unit arresters, as compared with those in the examples of FIGS. 5 and 6. Thus, FIG. 7 does not illustrate arrester energy.

Figure 8:
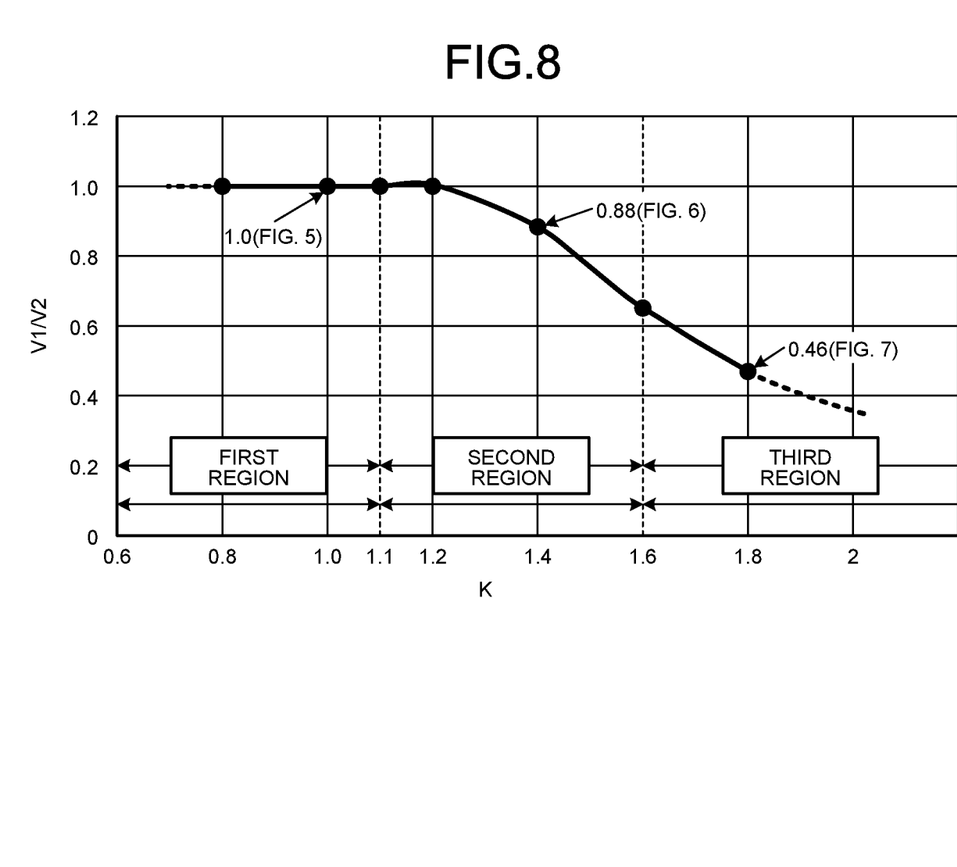
FIG. 8 is a diagram illustrating a characteristic curve representing the characteristics of the principal part of the first embodiment.

FIG. 8 is a diagram illustrating a characteristic curve representing the characteristics of the principal part of the first embodiment. In FIG. 8, the horizontal axis represents the value of the multiple K and the vertical axis represents the value of V1/V2. In addition to the execution results in FIG. 7, FIG. 8 adds the value of V1/V2 based on simulation results with K=0.8, 1.1, 1.2, and 1.6.

The value of V1/V2 closer to one means more voltage equalization. On the other hand, when the multiple K is decreased, energy processed by the unit arresters increases. According to their conflicting relationship, in FIG. 8, the characteristics of the characteristic curve depending on the value of the multiple K are divided into three regions. Specifically, a region where the value of the multiple K is less than 1.1 is set as a first region, a region where the value of the multiple K is 1.1 or more and 1.6 or less is set as a second region, and a region where the value of the multiple K exceeds 1.6 is set as a third region.

The first region is not a preferable region because, although the rate of voltage equalization is high, energy processed by the unit arresters is large. The third region is also not a preferable region because, although energy processed by the unit arresters may be small, the rate of voltage equalization is low. On the other hand, the second region is a preferable region because the rate of voltage equalization is relatively high, and energy processed by the unit arresters may be small.

Thus, in the first embodiment, the principal part is configured with the value of the multiple K in the range of 1.1 or more and 1.6 or less.

As described above, FIGS. 5 to 7 illustrate the case where the negative TRV is large as examples. When the negative TRV is large, a unit that interrupts first bears all the negative TRV. Consequently, it takes a long time to reach the clamping voltage, and an imbalance in voltage sharing is likely to occur. In particular, when the multiple K is large, the clamping voltage of each unit arrester becomes relatively high. Consequently, when the main interrupter Cb2 that interrupts late reaches the clamping voltage of the main interrupter Cb2, the difference voltage between the clamping voltage of the main interrupter Cb2 and the clamping voltage of the all-point arrester 6 is applied to the main interrupter Cb1. That is, when the negative TRV is large, the imbalance in voltage sharing increases between the main interrupter Cb1 and the main interrupter Cb2.

Figure 9:
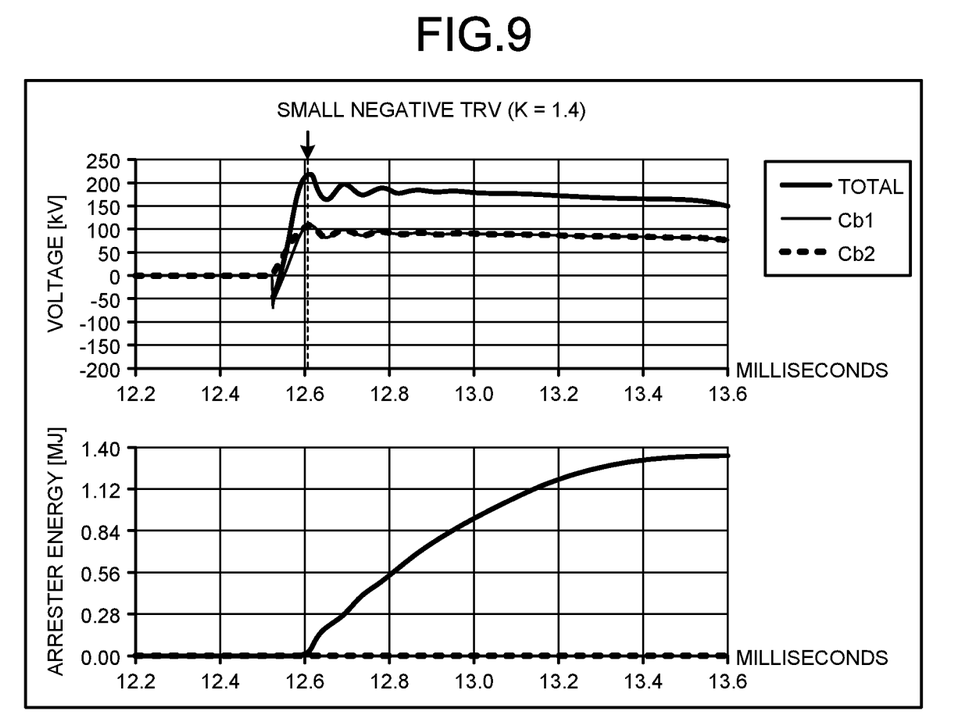
FIG. 9 is a diagram illustrating a fourth example waveform for explaining the principal part of the first embodiment.

By contrast, FIG. 9 illustrates a case where the multiple K is K=1.4 as an example of a case where the negative TRV is small. FIG. 9 is a diagram illustrating a fourth example waveform for explaining the principal part of the first embodiment.

When the negative TRV is small, the voltages of the main interrupters Cb1 and Cb2 are easily equalized to one-to-one at the point of time when the clamping voltage of the all-point arrester 6 is reached. This is because the smaller the negative TRV, the smaller the difference between the times until the interrupter that interrupts first and the interrupter that interrupts later reach the clamping voltages of the corresponding arresters. Thus, it is no exaggeration to say that when the negative TRV is small, there is no influence on the above-described range of numerical limitations.

As described above, in the breaking device according to the first embodiment, the clamping voltages of the first arresters are equal between the plurality of interrupting units, and are set in the range of 1.1 to 1.6 times the value obtained by dividing the clamping voltage of the second arrester by the number of the interrupting units connected in series in the interrupting section. This allows the breaking device of the multi-break configuration to prevent the withstand voltage performance of the interrupting section from becoming excessive, allowing further reductions in the size and cost of the interrupting section.

Second Embodiment

In the first embodiment, the case where the main interrupter 21 (Cb1) interrupts first, and the main interrupter 22 (Cb2) interrupts later has been described as an example. In practice, an interrupter that interrupts later may have a more severe interrupting duty than an interrupter that interrupts first. Thus, in a second embodiment, an embodiment for relaxing the interrupting duty of an interrupter that interrupts late will be described.

Figure 10:
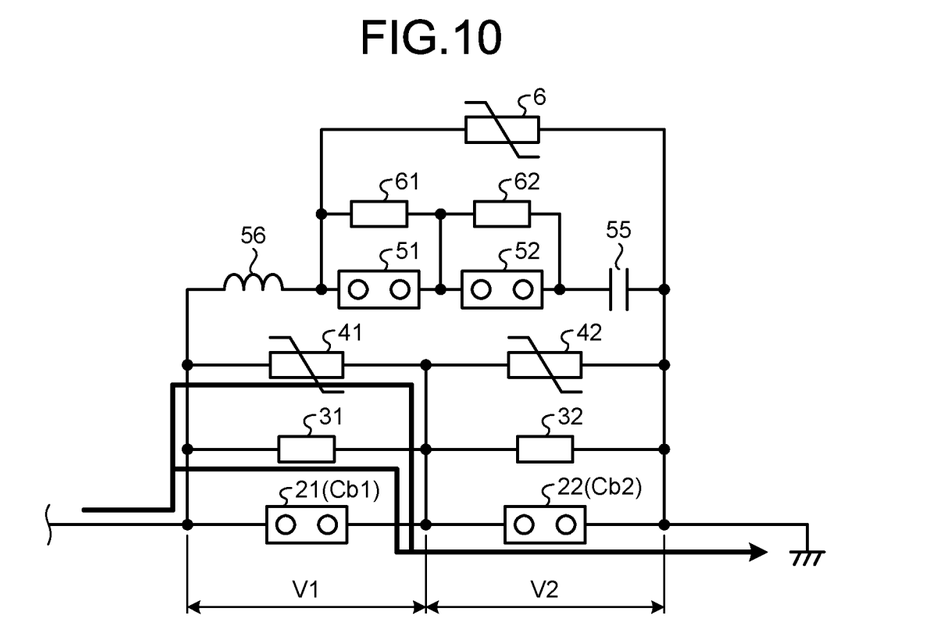
FIG. 10 is a diagram for explaining the reason why the interrupting duty of an interrupter that interrupts late becomes severe in the configuration of the first embodiment.
Figure 11:
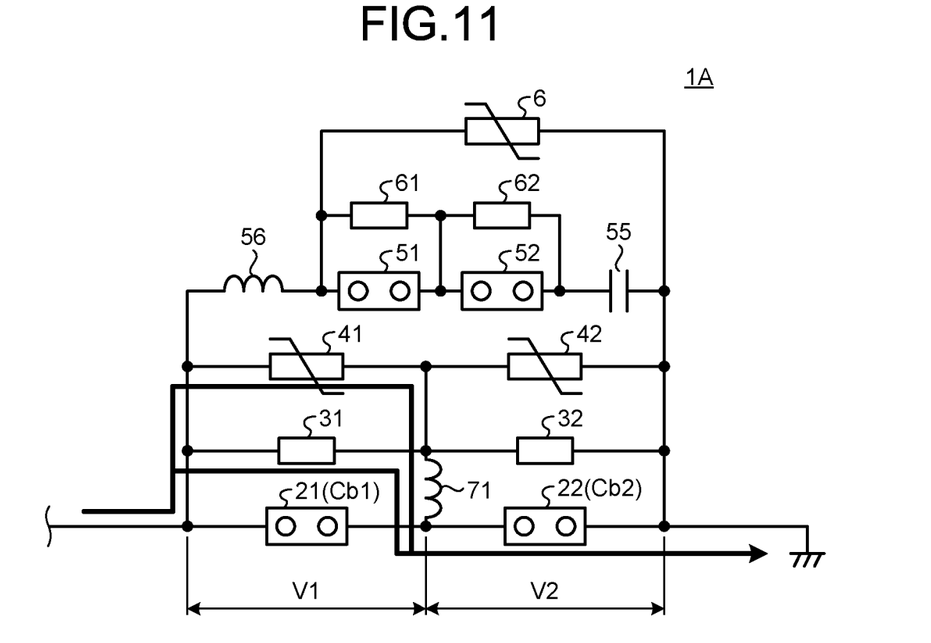
FIG. 11 is a diagram illustrating a configuration of the principal part of a breaking device according to a second embodiment that relaxes the interrupting duty of an interrupter that interrupts late.
Figure 12:
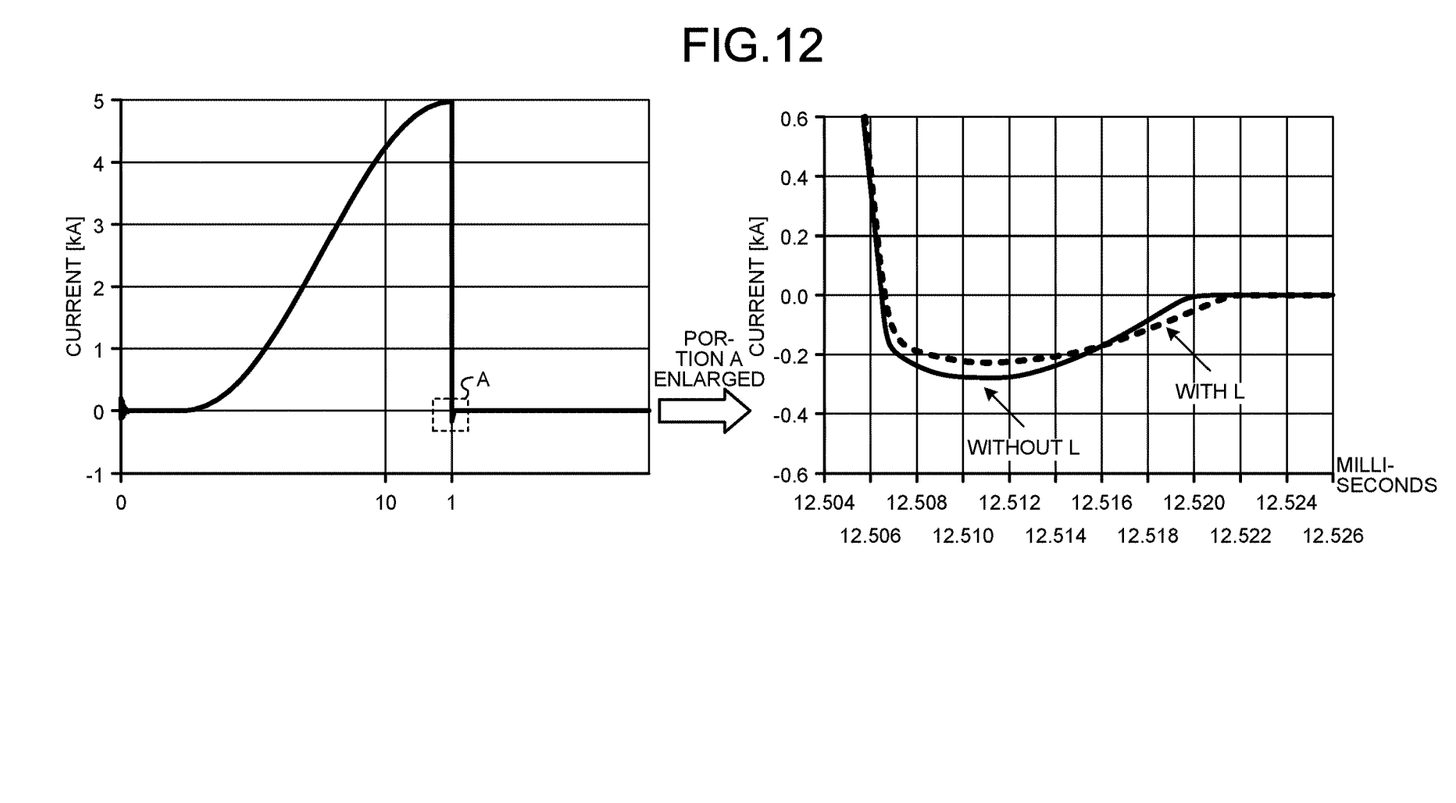
FIG. 12 is a diagram illustrating an example of a waveform of a current flowing through the interrupter that interrupts late in the configuration of FIG. 11.

FIG. 10 is a diagram for explaining the reason why the interrupting duty of an interrupter that interrupts late becomes severe in the configuration of the first embodiment. FIG. 11 is a diagram illustrating a configuration of the principal part of a breaking device according to the second embodiment that relaxes the interrupting duty of the interrupter that interrupts late. FIG. 12 is a diagram illustrating an example of a waveform of a current flowing through the interrupter that interrupts late in the configuration of FIG. 11.

When the main interrupter 21 interrupts before the main interrupter 22, as illustrated in FIG. 10, current flows to the main interrupter 22 via the impedance circuit 31 and the unit arrester 41 associated with the main interrupter 21. At this time, the current flowing through the main interrupter 22 depends on the frequency determined by the total impedance of a circuit through which the current flows. Thus, the current flowing through the main interrupter 22 may have a high current change rate di/dt at current zero, and the interrupting duty of the main interrupter 22 becomes severe. Therefore, in a breaking device 1A according to the second embodiment, as illustrated in FIG. 11, a reactor 71 is connected between a point of connection between the system side of the impedance circuit 31 associated with the main interrupter 21 and the power supply side of the impedance circuit 32 associated with the main interrupter 22 and a point of connection between the system side of the main interrupter 21 and the power supply side of the main interrupter 22. This connection causes current flowing to the main interrupter 22 to flow through the reactor 71 as illustrated in FIG. 11.

FIG. 12 illustrates, on the left side, an example of a waveform of current flowing through the main interrupter 22 that interrupts late. FIG. 12 also illustrates, on the right side, the current in a portion A indicated by a dashed square in the waveform diagram on the left side of FIG. 12 enlarged.

In current waveforms on the right side of FIG. 12, a thick solid line is a waveform when the reactor 71 is not provided, and a thick broken line is a waveform when the reactor 71 is provided. As illustrated in this figure, when the reactor 71 is provided, the frequency and the current peak value of the current flowing through the main interrupter 22 can be made smaller than when the reactor 71 is not provided. Thus, the configuration of the second embodiment can provide the effect of being able to relax the interrupting duty of the main interrupter 22 that interrupts late.

FIG. 11 illustrates the case where the number of the interrupting units connected in series is two. It goes without saying that in a case where the number of interrupting units connected in series is three or more, the reactors 71 are also disposed as in FIG. 11. That is, the reactor 71 is connected between a point of connection between each two main interrupters connected in series and a point of connection between each two impedance circuits corresponding to the each two main interrupters.

Third Embodiment

Figure 13:
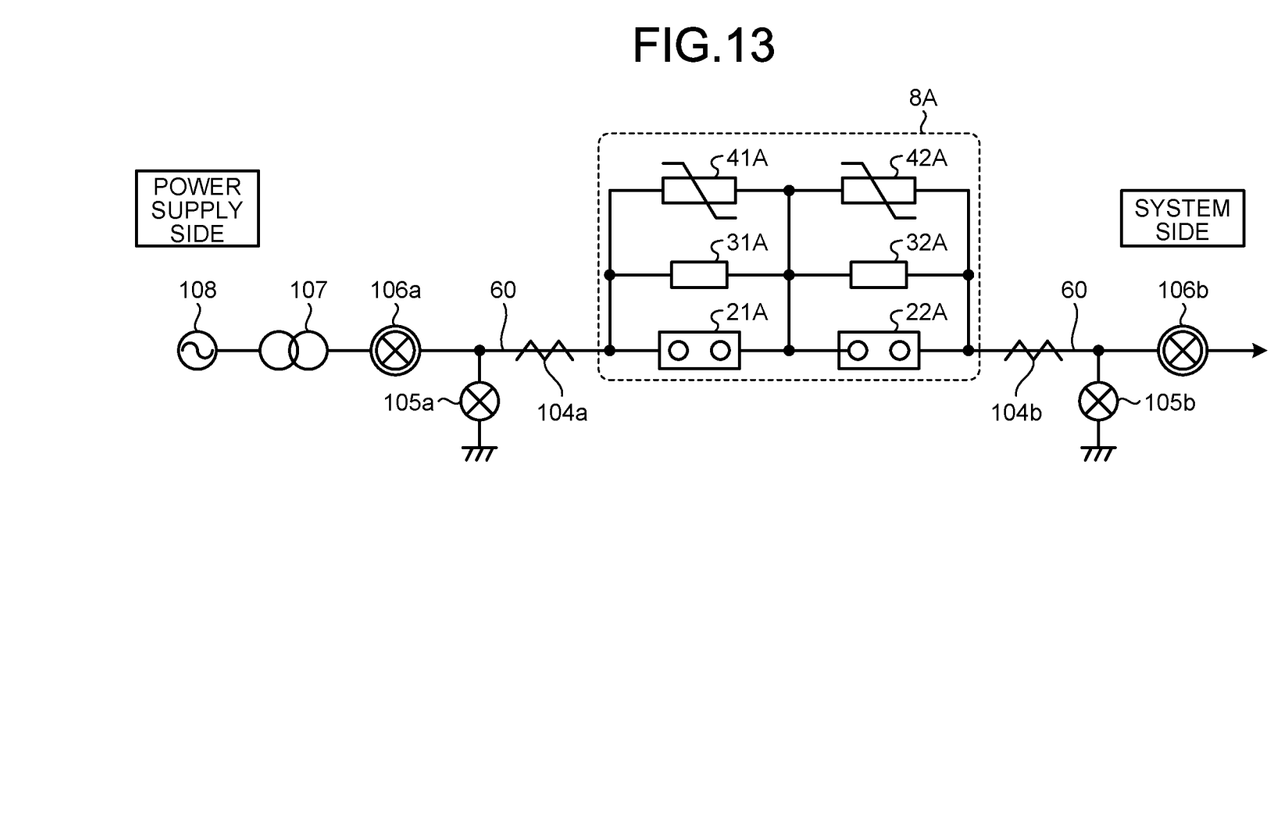
FIG. 13 is a diagram illustrating an example of arrangement of a breaking device according to a third embodiment in which an interrupting section in the first embodiment is used as an interrupting section for AC interruption.

The first embodiment is an embodiment using the interrupting section 8 as an interrupting section for DC interruption. In a third embodiment, an embodiment using the interrupting section 8 as an interrupting section for AC interruption will be described. FIG. 13 is a diagram illustrating an example of arrangement of a breaking device according to the third embodiment in which the interrupting section in the first embodiment is used as an interrupting section for AC interruption.

In FIG. 13, an interrupting section 8A in the third embodiment is disposed on an AC line 60. The left side of the interrupting section 8A is the power supply side. One end of the interrupting section 8A is connected to an AC source 108 via a transformer 107. A grounding switch 105a and a disconnector 106a are disposed between the one end of the interrupting section 8A and the transformer 107. The right side of the interrupting section 8A is the system side. A grounding switch 105b and a disconnector 106b are disposed on the system side of the interrupting section 8A. In addition, current transformers 104a and 104b are disposed on the AC line 60 on both the power supply side and the system side.

The interrupting section 8A includes main interrupters 21A and 22A connected in series. An impedance circuit 31A and a unit arrester 41A are connected in parallel to both ends of the main interrupter 21A. An impedance circuit 32A and a unit arrester 42A are connected in parallel to both ends of the main interrupter 22A. FIG. 13 illustrates the case where the number of main interrupters connected in series in the interrupting section 8A is two, but the present invention is not limited thereto. The number of main interrupters connected in series in the interrupting section 8A may be three or more.

In the third embodiment, the interrupting section 8A is also configured to have similar characteristics to the interrupting section 8 described in the first embodiment. Thus, the third embodiment can also have the effects described in the first embodiment.

The configurations described in the above embodiments illustrate examples of the subject matter of the present invention, and may be combined with another known art, and may be partly omitted or changed without departing from the scope of the present invention.

REFERENCE SIGNS LIST 1, 1A breaking device; 2 main interrupter group; 2a, 2b, 2c, 2d interrupting unit; 3 voltage divider circuit group; 4 unit arrester group; 5 resonant circuit section; 6 all-point arrester; 7 voltage sharing improvement section; 8, 8A interrupting section; 10 controller; 21, 21A, 22, 22A, 23, 24, Cb1, Cb2 main interrupter; 31, 31A, 32, 32A, 33, 34, 61, 62 impedance circuit; 41, 41A, 42, 42A, 43, 44 unit arrester; 50 DC line; 51, 52, 53, 54 closing switch; 55 capacitor; 56, 71 reactor; 60 AC line; 80, 81, 106a, 106b disconnector; 104a, 104b current transformer; 105a, 105b grounding switch; 107 transformer; 108 AC source; 200 processor; 202 memory; 204 interface.

The invention claimed is:

1. A breaking device comprising:
an interrupting section including a plurality of interrupting units, in each of which a main interrupter, a voltage divider circuit, and a first arrester are connected in parallel to each other, a plurality of the main interrupters being connected in series;
a resonant circuit section including a reactor, a capacitor, and a closing switch, the resonant circuit section being connected in parallel to the interrupting section; and
a second arrester connected in parallel to the interrupting section via the reactor, wherein
clamping voltages of the first arresters are equal between the plurality of interrupting units, and are in a range of 1.1 to 1.6 times a value obtained by dividing a clamping voltage of the second arrester by the number of the interrupting units connected in series in the interrupting section.

2. The breaking device according to claim 1, wherein a reactor is connected between a point of connection between each two main interrupters connected in series and a point of connection between each two voltage divider circuits corresponding to the each two main interrupters.

3. The breaking device according to claim 1, wherein the interrupting section is used as an interrupting section for DC interruption.

4. The breaking device according to claim 1, wherein the interrupting section is used as an interrupting section for AC interruption.

5. The breaking device according to claim 2, wherein the interrupting section is used as an interrupting section for DC interruption.

* * * * *